(12) United States Patent
Bischoff

(10) Patent No.: US 8,195,435 B2
(45) Date of Patent: Jun. 5, 2012

(54) HYBRID DIFFRACTION MODELING OF DIFFRACTING STRUCTURES

(75) Inventor: Joerg Bischoff, Ilmenau (DE)

(73) Assignees: Tokyo Electron Limited, Tokyo (JP); KLA-Tencor Corporation, Milpitas, CA (US)

(*) Notice: Subject to any disclaimer, the term of this patent is extended or adjusted under 35 U.S.C. 154(b) by 687 days.

(21) Appl. No.: 12/340,421

(22) Filed: Dec. 19, 2008

(65) Prior Publication Data

US 2010/0157315 A1 Jun. 24, 2010

(51) Int. Cl.
*G06F 7/60* (2006.01)
*G06F 17/10* (2006.01)
(52) U.S. Cl. .............................. 703/2; 717/135
(58) Field of Classification Search .................. 703/2; 356/601–635, 445, 446; 717/135
See application file for complete search history.

(56) References Cited

U.S. PATENT DOCUMENTS

| 5,963,329 A | 10/1999 | Conrad et al. |
| 6,590,656 B2 | 7/2003 | Xu |
| 2006/0132806 A1* | 6/2006 | Shchegrov et al. ........... 356/625 |

OTHER PUBLICATIONS

Lefeng, Li; "Formulation and comparison of two recursive matrix algorithms for modeling layered diffraction gratings" Journal of the Optical Society of America, vol. 13, No. 5, May 1996, pp. 1024 to 1035.*

Jonathan Mas, Engelbert Mittermeier, "A novel model building flow for the simulation of proximity effects of mask processes" Master Nontech, INPG, Munich, Germany, Jan. 2007, 10 pages.*

Chandezon, J., et al., "A new theoretical method for diffraction grating and its numerical application", *Journal of Optics*, vol. 11, No. 4, (1980), 235-241.

Granet, G., et al., "Scattering by a periodically corrugated dielectric layer with non-identical identical faces", *Pure Applied Optics 4*, (1995), 1-5.

Li, Lifeng, "New formulation of the Fourier modal method for crossed surface-relief gratings", *J. Opt. Soc. Am. A*, vol. 14, No. 10, (Oct. 1997), 2758-2767.

Li, Lifeng, "Note on the S-matrix propagation algorithm", *J. Opt. Soc. Am. A*, vol. 20, No. 4, (Apr. 2003), 655-660.

Li, Lifeng, et al., "Rigorous and efficient grating-analysis method made easy for optical engineers", *Applied Optics*, vol. 38, No. 2, (Jan. 10, 1999), 304-313.

Moharam, M. G., et al., "Diffraction analysis of dielectric surface-relief gratings", *Journal of the Optical Society of America*, vol. 72, No. 10, (Oct. 1982), 1385-1392.

* cited by examiner

*Primary Examiner* — Dwin M Craig
(74) *Attorney, Agent, or Firm* — Blakely, Sokoloff, Taylor & Zafman

(57) ABSTRACT

Diffraction modeling of a diffracting structure employing at least two distinct differential equation solution methods. In an embodiment, a rigorous coupled wave (RCW) method and a coordinate transform (C) method are coupled with a same S-matrix algorithm to provide a model profile for a scatterometry measurement of a diffracting structure having unknown parameters. In an embodiment, a rigorous coupled wave (RCW) method and a coordinate transform (C) method generate a modeled angular spectrum of diffracted orders as a prediction for how a diffracting photolithographic mask images onto a substrate.

10 Claims, 12 Drawing Sheets

HYBRID DIFFRACTION MODELING OF DIFFRACTING STRUCTURES

TECHNICAL FIELD

Embodiments of the invention pertain to methods and systems for modeling of diffracted signals and more particularly as applied to scatterometry and photolithography simulations.

BACKGROUND

Optical metrology techniques generally referred to as scatterometry offer the potential to characterize parameters of a workpiece during a manufacturing process. In practice, light is directed onto a diffracting structure, such as a periodic grating, in a workpiece and a spectrum of reflected light is measured and analyzed to characterize unknown parameters of the diffracting structure. Characterization parameters may include critical dimensions (CD), sidewall angle (SWA), feature height (HT) and any others which vary a material's reflectivity and refractive index. Characterization of the diffracting structure may thereby characterize the workpiece as well as manufacturing process employed in the formation of the diffracting structure and the workpiece.

Analysis of a measured spectrum typically involves comparing the measurement data to theoretical spectra to deduce the parameters that best describe the measured diffracting structure. A theoretical spectrum for a set of parameter values (e.g., a line profile) can be computed using rigorous diffraction modeling algorithms, such as Rigorous Coupled Wave Analysis (RCWA). In RCWA, a model of a line profile used for predicting intensity versus wavelength is expressed as a set of stacked slices or slabs of material, as shown in FIG. 1. Each slab is defined by a width $W_S$, a height $H_S$, and an index of refraction $n_S$. By means of the slicing the differential Maxwell equations can be transformed into an eigen equation. The boundary conditions of the electromagnetic field across the model profile are transformed into boundary conditions for a staircase profile. The model profile is then used as an input to a computer program that predicts the percentage of reflected energy diffracted into the zeroth order over a range of wavelengths for the model profile. The predicted intensity is compared to the measured intensity as a function of wavelength (normalized for the incident intensity) and the slab widths and heights are adjusted until agreement between the predicted and measured intensity versus wavelength curves is achieved. The final result of the analysis is a stacked set of slabs that represents the line profile of each line of the diffracting structure.

Although profiles can be approximated by model profile including a series of stacked slabs, the minimum number of slabs required for an adequate approximation with RCWA methods can be prohibitively high for certain profiles encountered in manufacturing processes. For example, structures having a relatively small SWA (i.e., shallow slope) and/or high index contrast (i.e., complex index of refraction with a large imaginary part) may suffer from poor calculation efficiency and poor convergence.

BRIEF DESCRIPTION OF THE DRAWINGS

The present invention is illustrated by way of example, and not by way of limitation, in the figures of the accompanying drawings and in which.

SUMMARY

Figure 1:
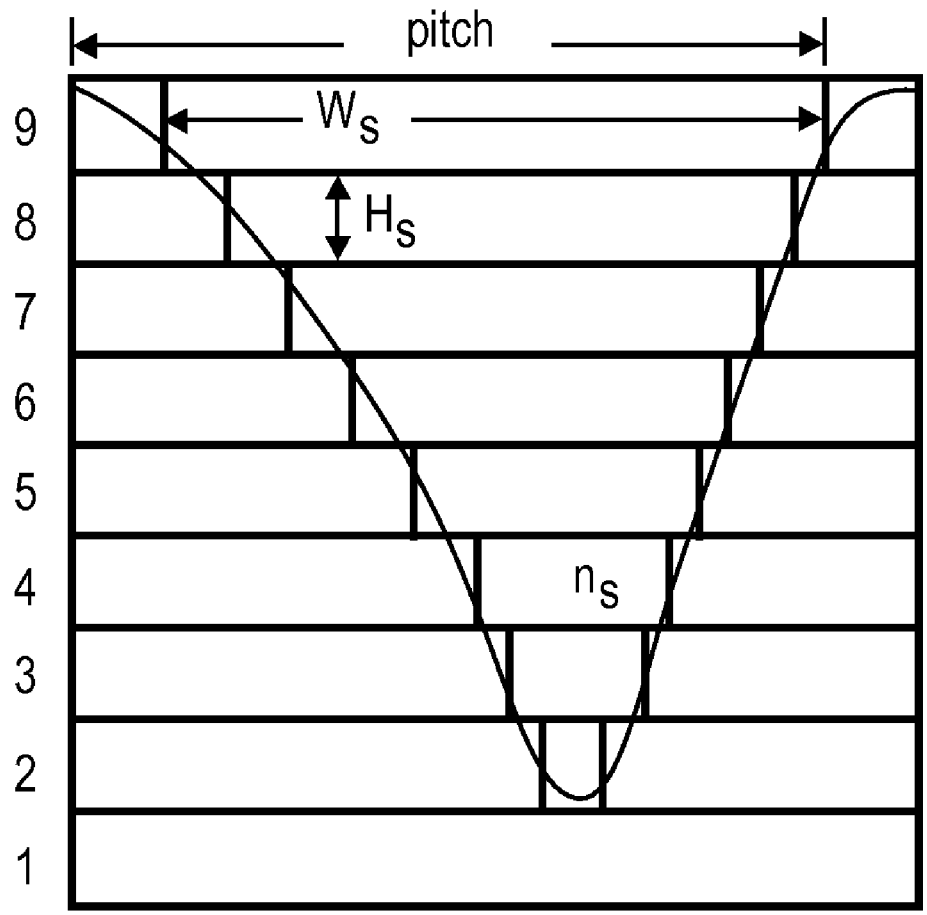
FIG. 1 illustrates a cross-section of a line profile of a diffracting structure modeled by a stack of slabs.

Methods, computer program products and systems to generate modeled diffracted signals are described. Modeled diffracted signals may be diffracted spectral signals (e.g., where modeled incident radiation is polychromatic) or angular spectrums of diffracted orders (e.g., where modeled incident radiation is monochromatic). In one embodiment, scatterometry analysis of a sample diffracting structure having unknown parameters is performed by calculating a modeled diffracted signal resulting from modeled electromagnetic radiation incident to a hybrid model profile for a hypothetical diffracting structure. The hybrid model profile includes at least one curved interface which varies with respect to a first dimension as well as a horizontal slab defined by two parallel interfaces which are constant with respect to the first dimension. In one such an embodiment, the modeled diffracted signal is determined using a plurality of differential equation systems solved by at least two distinct solution methods. Using the hybrid model, the modeled diffracted signal is calculated for a modeled incident electromagnetic radiation. The modeled diffracted signal is then output as a reference for comparison with a measured sample signal to determine the unknown parameters of the sample diffracting structure.

In a further embodiment, a modeled diffracted signal is determined for the hybrid model profile by solving a first differential equation system of the curved interface with a first solution method and solving a second differential equation system of the horizontal slab by second solution method. A resulting plurality of response wave modes with a plurality of cause wave modes are recursively coupled between the curved interface solution and the horizontal slab solution, for example with an S-matrix algorithm, to generate a scattering matrix for the hybrid model profile, $S_{stack}$. A reflection matrix, R, for the hybrid model profile is then determined.

In another embodiment, an optical metrology system for analysis of a sample diffracting structure having unknown parameters includes a library generator configured to model a diffracted signal for each of a plurality of hybrid model profiles for parameterized diffracting structures. The optical metrology system includes a metrology processor to compare modeled diffraction information calculated from the hybrid model profiles with the measured sample diffracted signal to deduce the unknown parameters based on the parameterized diffracting structures.

Another embodiment includes a machine-accessible storage medium storing instructions for a data processing system to output a modeled diffracted signal based on a hybrid model profile for a diffracting structure, the hybrid model profile including a curved interface which varies with respect to a first dimension and a horizontal slab defined by two parallel interfaces which are constant with respect to the first dimension.

DETAILED DESCRIPTION

In the following description, numerous details are set forth. It will be apparent, however, to one skilled in the art, that the present invention may be practiced without these specific details. For example, while the present methods are described in the context of scatterometry for diffraction grating parameter measurements, it should be appreciated that the methods may be readily adaptable to other contexts and applications by one of ordinary skill in the art.

In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

In an embodiment of the present invention, a diffraction solution for a physical diffracting structure is determined using a plurality of differential equation systems solved by a plurality of solution methods. Because the diffraction solution employs more than one differential equation system (DES), the diffraction solution method is referred to herein as a "hybrid" solution method. In one such hybrid solution method, a first DES is solved using a first solution method and a second DES is solved using a second solution method. The two solutions are coupled together to arrive at a diffraction solution for a parameterized model profile of a diffracting structure. In one embodiment, a "hybrid CRCWA" solution method utilizes both curvilinear coordinate transformation (C) and RCWA. In a further embodiment, the C method and RCWA method are combined into one S-matrix recursion algorithm.

Figure 2:
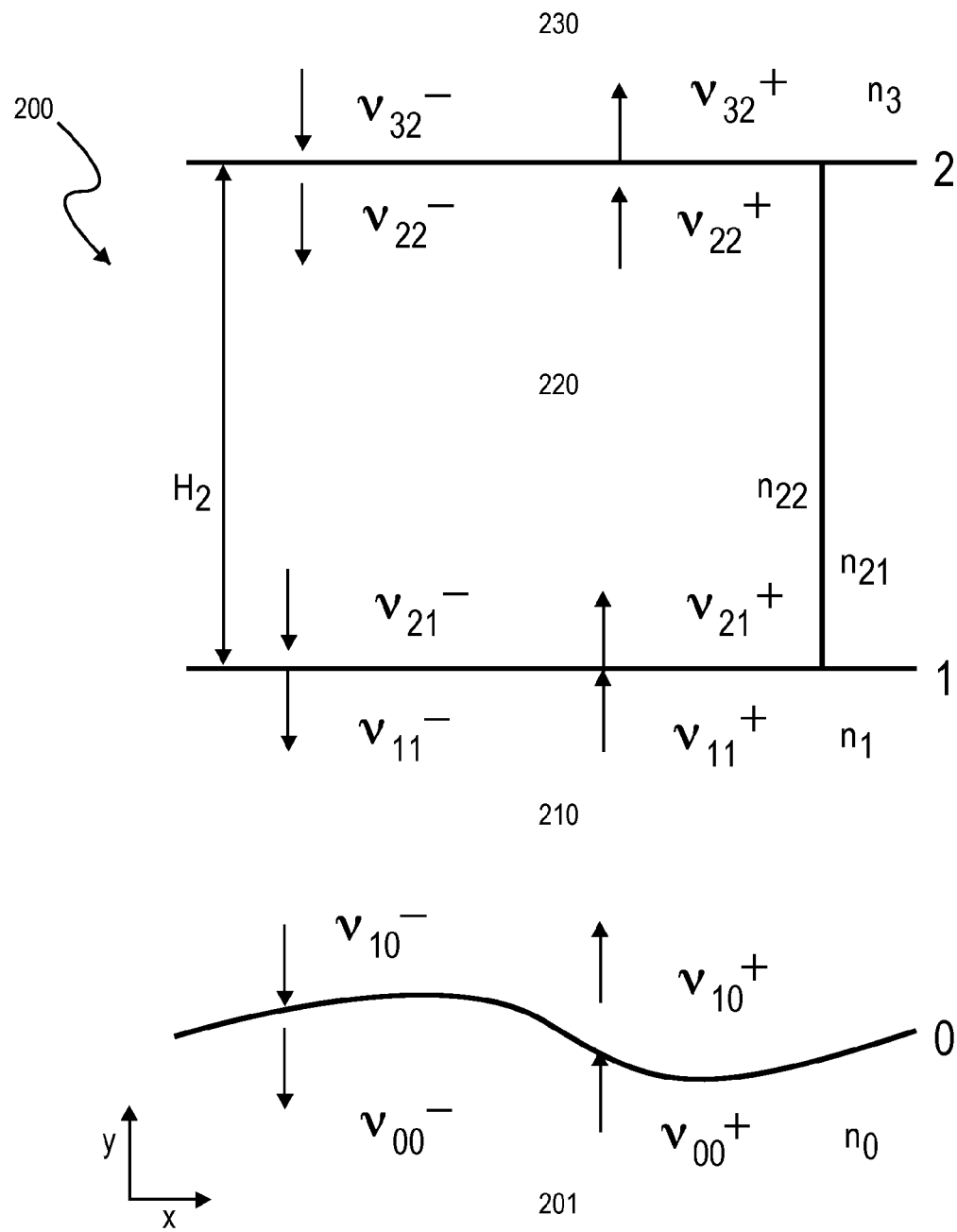
FIG. 2 illustrates an exemplary hybrid model profile for a portion of a diffracting structure, the hybrid model profile includes a curved interface which varies with respect to a first dimension and a horizontal slab defined by two parallel interfaces which are constant with respect to the first dimension, in accordance with an embodiment.

FIG. 2 depicts an exemplary hybrid model profile 200 adapted for an exemplary embodiment of a hybrid CRCWA algorithm. The hybrid model profile 200 includes a curved interface 0 which is single valued and varies continuously with respect to a first dimension (e.g., is a function of x) in Cartesian coordinates. As further depicted, a substrate regime 201 having a refractive index $n_0$ is under the curved interface 0. Over the curved interface 0 is a regime 210 having a refractive index $n_1$. Thus, a material between the curved interface and an adjacent interface below or above the curved interface 0 has a constant refractive index. The hybrid model profile 200 also includes a horizontal slab 220 defined by a slab interface 1 and a slab interface 2 which are parallel to each other and constant with respect to the first dimension (e.g., independent of x). The horizontal slab 220 is defined to have a constant refractive index across the thickness $H_2$, in a normal direction, between the slab interface 1 and the slab interface 2 (i.e., refractive index is independent of y within the horizontal slab 220) while the refractive index of the horizontal slab 220 varies with x. For example, as depicted in FIG. 2, the refractive indexes $n_{21}$ and $n_{22}$ are each constant across thickness $H_2$, however the indexes $n_{21}$ and $n_{22}$ are not equal. Above the horizontal slab 220, adjacent to the slab interface 2, is the superstrate 230 having a refractive index of $n_3$.

The hybrid model profile 200 represents an arrangement of layers and interfaces which can either provide a complete model profile or be inserted between an arbitrary number of other model layers and/or interfaces such that the hybrid model profile 200 becomes a portion of a larger model profile of a physical diffracting structure. Depending on the embodiment, additional horizontal slabs may be utilized above or below the horizontal slab 220 and/or below the curved interface 0. Similarly, other model profiles may utilize stacks which include additional curved interfaces above or below the curved interface 0 and/or above the horizontal slab 220. In any case, the general conditions depicted in FIG. 2 are either merely repeated or rearranged in a manner which remains solvable through application of the methods described elsewhere herein.

FIG. 2 further depicts wave modes, v, at each interface of the hybrid model profile 200. The wave modes represent both transmission and reflection modes so wave modes may be considered to travel up and down, as denoted in FIG. 2 with ± superscripts. In the wave modes of FIG. 2, the first subscript represents the layer or regime and the second subscript represent the interface at which the mode is evaluated. So that, for example, response wave modes $(v_{00}^+, v_{10}^+)$ may be coupled to cause wave modes $(v_{00}^-, v_{10}^-)$ across the curved interface 0.

Figure 3A:
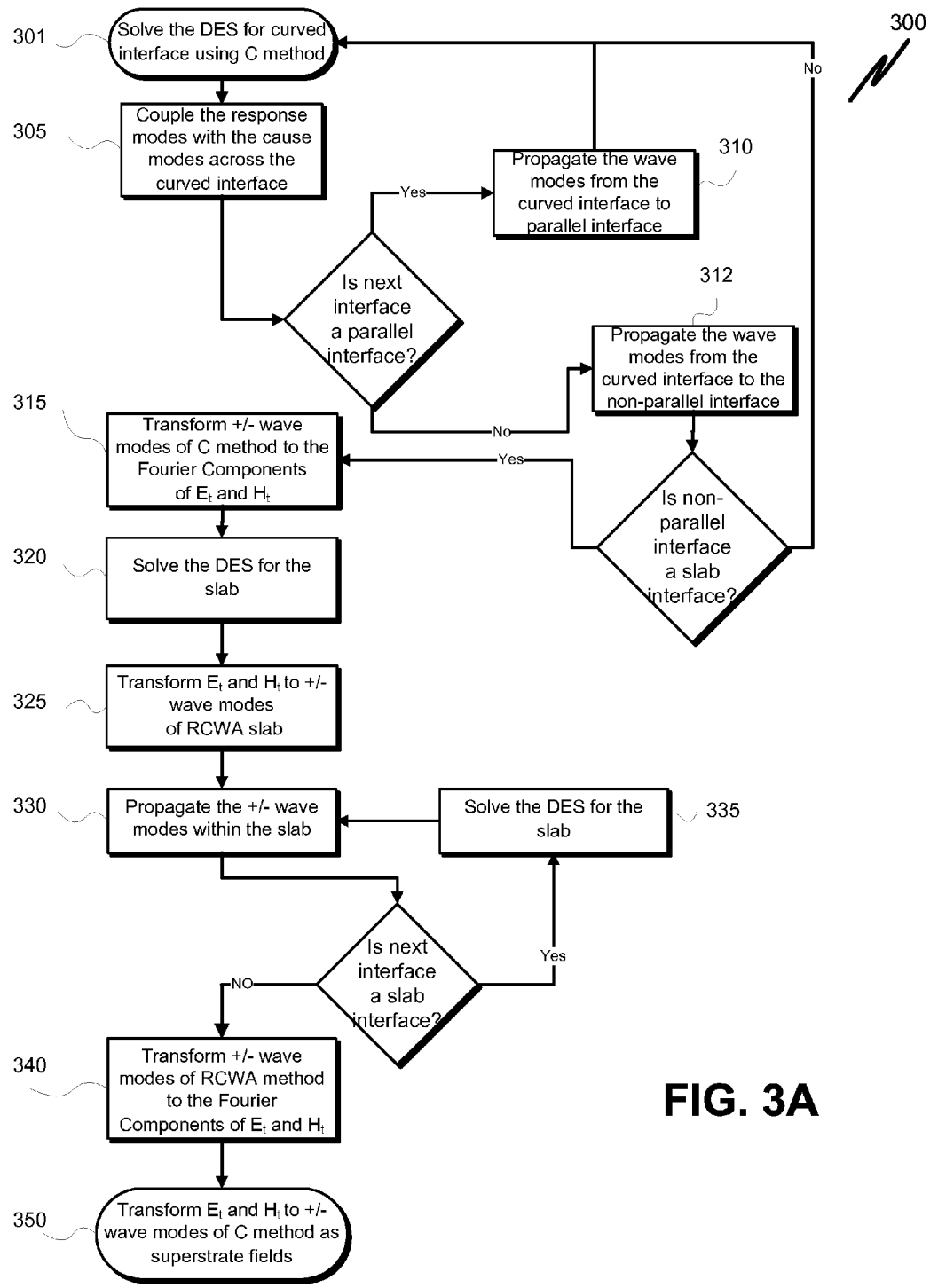
FIG. 3A is an exemplary flow diagram illustrating a hybrid method of calculating a diffraction solution for the hybrid model profile illustrated in FIG. 2, in accordance with an embodiment.

FIG. 3A is an exemplary flow diagram illustrating one embodiment of a hybrid CRCWA method of calculating a diffraction solution from the hybrid model profile 200. The exemplary method depicted in FIG. 3A begins at operation 301 by solving a first DES for a curved interface, such as the curved interface 0 of FIG. 2, using the C-method. A detailed description of the C-method may be found in "A new theoretical method for diffraction gratings and its numerical application," by Chandezon et al., *Journal of Optics*, vol. 11, no. 4, pp. 235-241, 1980 and "Rigorous and efficient grating-analysis method made easy for optical engineers," by Li et al., *Journal of Applied Optics*, vol. 38, no. 2, pp. 304-313, Jan. 10, 1999.

Generally, the formulation of first DES for the C-method begins with the wave equation:

$$\left(\frac{\partial^2}{\partial x^2} + \frac{\partial^2}{\partial y^2} + k_0^2 \mu \varepsilon\right) F = L(\partial_x, \partial_y) = 0, \quad (1)$$

where $$F = H_z, k_0 = 2\frac{\pi}{\lambda},$$

where λ is the vacuum wavelength and ∈ is the relative permittivity of the material medium. A coordinate transform is performed such that a Cartesian space is transformed by the function a(x) describing the curved interface (e.g., curved interface 0 of FIG. 2). For example, where the curved interface is described by y=a(x) in Cartesian space, spatial coordinates v and u are introduced, where v=x, and u=y−a(x). As such, when x is varied along the curved interface (i.e., u is held constant), (x,u) forms a curve parallel to the curved interface such that ∈ remains constant.

The chain rule of differentiation may then be applied to the transformed coordinates:

$$\frac{\partial}{\partial x} = \frac{\partial v}{\partial x}\frac{\partial}{\partial v} + \frac{\partial u}{\partial x}\frac{\partial}{\partial u} = \frac{\partial}{\partial v} - \dot{a}\frac{\partial}{\partial u}, \quad (2)$$

$$\frac{\partial}{\partial y} = \frac{\partial v}{\partial y}\frac{\partial}{\partial v} + \frac{\partial u}{\partial y}\frac{\partial}{\partial u} = \frac{\partial}{\partial u}. \quad (3)$$

Equation (1) then becomes:

$$L(\partial_x, \partial_y; x) = \frac{\partial^2}{\partial v^2} - 2\dot{a}\frac{\partial^2}{\partial v \partial u} - \ddot{a}\frac{\partial}{\partial u} + (1+\dot{a})\frac{\partial^2}{\partial u^2} + k_0^2 \mu \varepsilon. \quad (4)$$

As such, the linear operator L is no longer a function of the "normal" direction u. The second-order differential equation (4) can then be made into a first-order DES utilizing Rayleigh expansions for the field F and expanding à into Fourier space to arrive at the eigenvalue equation:

$$\begin{bmatrix} \frac{1}{\beta^{(p)2}}(\alpha\dot{a} + \dot{a}\alpha) & \frac{1}{\beta^{(p)2}}(1+\dot{a}\dot{a}) \\ 1 & 0 \end{bmatrix} \begin{pmatrix} F \\ F' \end{pmatrix} = \frac{1}{\rho}\begin{pmatrix} F \\ F' \end{pmatrix}, \quad (5)$$

where p=1 and 2 for either side of the interface at which the eigensystem is to be solved (e.g., substrate regime 201 and layer 210, respectively in FIG. 2), $$\beta_m = \sqrt{n_p^2 k_0^2 - \alpha_m^2},$$

$$\alpha_m = k_0 \sin\theta + m\frac{2\pi}{d}, \frac{\partial}{\partial v} = i\alpha,$$

$$\frac{\partial}{\partial u} = i\rho \text{ and } F' = -i\frac{\partial F}{\partial u}.$$

The total field $H_z$ may be expressed as a superposition of the incident wave and all the eigensolutions with all −wave modes for p=1 and +wave modes for p=2 discarded (e.g., discarding −wave modes in layer 201 and +wave modes in layer 210 of FIG. 2). However, to improve convergence, the real eigensolutions may be replaced by their Rayleigh counterparts in the transformed coordinate space and the ±wave modes are matched at the interface as a boundary condition to arrive at the matrix equations:

$$[F_R^+, F_e^+, -F_R^-, -F_e^-] \begin{bmatrix} R \\ C^+ \\ T \\ C^- \end{bmatrix} = -F_R^{in}, \quad (6)$$

where, $F_R^{in}$ is the incident wave mode, $F_R^+$ and $F_R^-$ are the Rayleigh solutions for the + and −wave modes, respectively, $F_e^+$ and $F_e^-$ are the elements of the F part of the eigenvectors of equation (5) and R, T, C¹, C⁺ are the unknown diffraction amplitudes. As such, N equations are provided for 2N unknowns. Boundary conditions of the tangential component of the electric field provide the remaining N equations. Specifically, the unnormalized tangential component, $G = E_x + \dot{a}E_y$, may be expressed in terms of F using the transformed coordinate variables x and u to yield:

$$[G_R^+, G_e^+, -G_R^-, -G_e^-] \begin{bmatrix} R \\ C^+ \\ T \\ C^- \end{bmatrix} = -G_0^{in}. \quad (7)$$

Equations (6) and (7) are then combined to arrive at the solvable system of linear equations to provide diffraction amplitudes R and T.

With the DES solution determined in operation 301, at operation 305, the system may then be sorted for cause and response modes to couple them across the curved interface. For example, using the notation in the hybrid model profile 200 depicted in FIG. 2, $$\begin{bmatrix} v_{10}^+ \\ v_{00}^- \end{bmatrix} = \begin{bmatrix} F_{10}^+ & -F_{00}^- \\ G_{10}^+ & -G_{00}^- \end{bmatrix}^{-1} \begin{bmatrix} F_{00}^+ & -F_{10}^- \\ G_{00}^+ & -G_{10}^- \end{bmatrix} \begin{bmatrix} v_{00}^+ \\ v_{10}^- \end{bmatrix} \quad (8)$$

Next, the wave modes are propagated to an adjacent interface. The propagation algorithm is dependent on whether the adjacent interface in the model profile is parallel or non-parallel to the curved interface. In the former case, at operation 310 the method described in "Multicoated grating: a differential formalism applicable in the entire optical region" by Chandezon et al., *Journal of the Optical Society of America*, Vol. 72, No. 7, pp. 839-846, 1982 may be applied by one of ordinary skill in the art. Operations 301 and 305 may then be repeated for the parallel curved interface. In the latter case, the adjacent interface is non-parallel to that solved by the C-method in operation 301. Under this condition, the half spectrum connection method may be applied. Generally, the half spectrum connection method entails expressing the wave modes at one coordinate system in the coordinates of the adjacent interface (above or below) and applying the S-matrix formulation. A detailed description of the half spectrum method is found in "Scattering by a periodically corrugated dielectric layer with non-identical faces," by Granet et al., *Pure Appl. Opt.* 4 Letter to the Editor, 1995.

For the exemplary hybrid model profile 200, because the slab interface 1 is not parallel to interface 0, the half spectrum connection method is applied to Equation (8) to form the propagation equation set $$\begin{bmatrix} v_{11}^+ \\ v_{10}^- \end{bmatrix} = \begin{bmatrix} 0 & (F_{11}^+)^{-1}\tilde{F}_{10}^+ \\ (F_{10}^-)^{-1}\tilde{F}_{11}^- & 0 \end{bmatrix} \begin{bmatrix} v_{11}^- \\ v_{10}^+ \end{bmatrix} \quad (9)$$

to propagate the wave modes from the curved interface 0 to the slab interface 1.

Method 300 is then dependent on whether the non-parallel interface is another curved interface or is an interface of a horizontal slab, such as the slab interface 1, depicted in FIG. 2. In the former case, method 300 proceeds to repeat operations 301 and 305 for the non-parallel, non-slab interface. In the latter case, the non-parallel interface is an interface of a horizontal slab, such as the slab interface 1, and the slab interface is treated as a horizontal C-interface and the method 300 proceeds to operation 315.

At operation 315 the ±wave modes (response wave modes and cause wave modes) are transformed from the sparse propagation matrix of Equation (9) into Fourier components of the tangential electromagnetic field ($E_t$, $H_t$). For example, the hybrid model profile 200 results in the matrix equations:

$$\begin{bmatrix} E_y \\ H_x \end{bmatrix} = \begin{bmatrix} F_{11}^- & F_{11}^+ \\ G_{11}^- & G_{11}^+ \end{bmatrix} \begin{bmatrix} v_{11}^- \\ v_{11}^+ \end{bmatrix}. \quad (10)$$

With the wave mode amplitudes now expressed as a vector of Fourier components of the tangential electromagnetic field, a DES for the horizontal slab 220 may then be solved at operation 320 using a second solution method performed in a Cartesian coordinate space and better suited to a slab or other discontinuous model layer than is the C-method used in operation 301. In one embodiment, the second solution method is RCWA, a detailed description of which may be found in "Diffraction analysis of dielectric surface-relief gratings" by Moharam et al., *Journal of the Optical Society of America*, Vol. 72, No. 10, pp. 1385-1392, October 1982.

With the solution for the horizontal slab, the tangential electromagnetic field ($E_t$, $H_t$) vector may then be transformed into the ±wave modes of the RCWA slab. For example, the horizontal slab 220 of FIG. 2 yields $$\begin{bmatrix} v_{21}^- \\ v_{21}^+ \end{bmatrix} = W^{-1} \begin{bmatrix} E_y \\ H_x \end{bmatrix}, \quad (11)$$

where $W^1$ is the inverted coefficient matrix of eigensolutions for the horizontal slab 220. At operation 330, the ±wave modes are then propagated with the horizontal slab 220 from the slab interface 1 to the slab interface 2 using a diagonalized eigensolution set. For example, application to FIG. 2 provides $$\begin{bmatrix} v_{22}^- \\ v_{22}^+ \end{bmatrix} = e^{j\lambda h} \begin{bmatrix} v_{21}^- \\ v_{21}^+ \end{bmatrix}. \quad (12)$$

Any known S-matrix algorithm may be utilized to perform the propagation. While FIG. 2 depicts a single horizontal slab 220, additional horizontal slabs may be handled by solving the DES for an adjacent slab at operation 335 using standard RCWA techniques and recursively performing operations 320 and 335 for each successive horizontal slab. When all slabs and interfaces of the profile model stack are accounted for, wave modes in the superstrate are determined.

In one embodiment, operations 340 and 350 are performed to arrive at the wave modes in the superstrate coupling with the uppermost interface. As shown in FIG. 3, the RCWA ±wave modes of the slab interface 3 are transformed back into a plurality of Fourier components of the tangential electromagnetic field to arrive at matrix equations for the slab interface 2:

$$\begin{bmatrix} E_y \\ H_x \end{bmatrix} = W \begin{bmatrix} v_{22}^- \\ v_{22}^+ \end{bmatrix}. \quad (13)$$

At operation 350, $E_t$, $H_t$ components are then transformed back to ±wave modes corresponding to C-method to link together the C-method solutions and the RCWA solutions. For example, for the hybrid model profile 200, the wave modes in the superstrate 230 are:

$$\begin{bmatrix} v_{32}^- \\ v_{32}^+ \end{bmatrix} = \begin{bmatrix} F_{32}^- & F_{32}^+ \\ G_{32}^- & G_{32}^+ \end{bmatrix} \begin{bmatrix} E_y \\ H_x \end{bmatrix}. \quad (14)$$

The recursive coupling described in method 300 results in a scattering matrix S of the entire hybrid model profile. In this manner, the C method and RCWA method are combined into one S-matrix recursion algorithm. For example, for the hybrid model profile 200 becomes $$\begin{bmatrix} v_{32}^+ \\ v_{00}^- \end{bmatrix} = S_{stack} \begin{bmatrix} v_{32}^- \\ v_{00}^+ \end{bmatrix}. \quad (15)$$

In this manner, the reflection matrix R of the whole stack (upper left sub-matrix of $S_{stack}$) couples the response wave mode $v_{32}^+$ (reflection) with the cause wave mode $v_{32}^-$ (excitation). In this manner, the hybrid diffraction solution method, as illustrated in FIG. 3A, may be utilized to generate modeled diffracted signals.

Figures 3B, 3C:
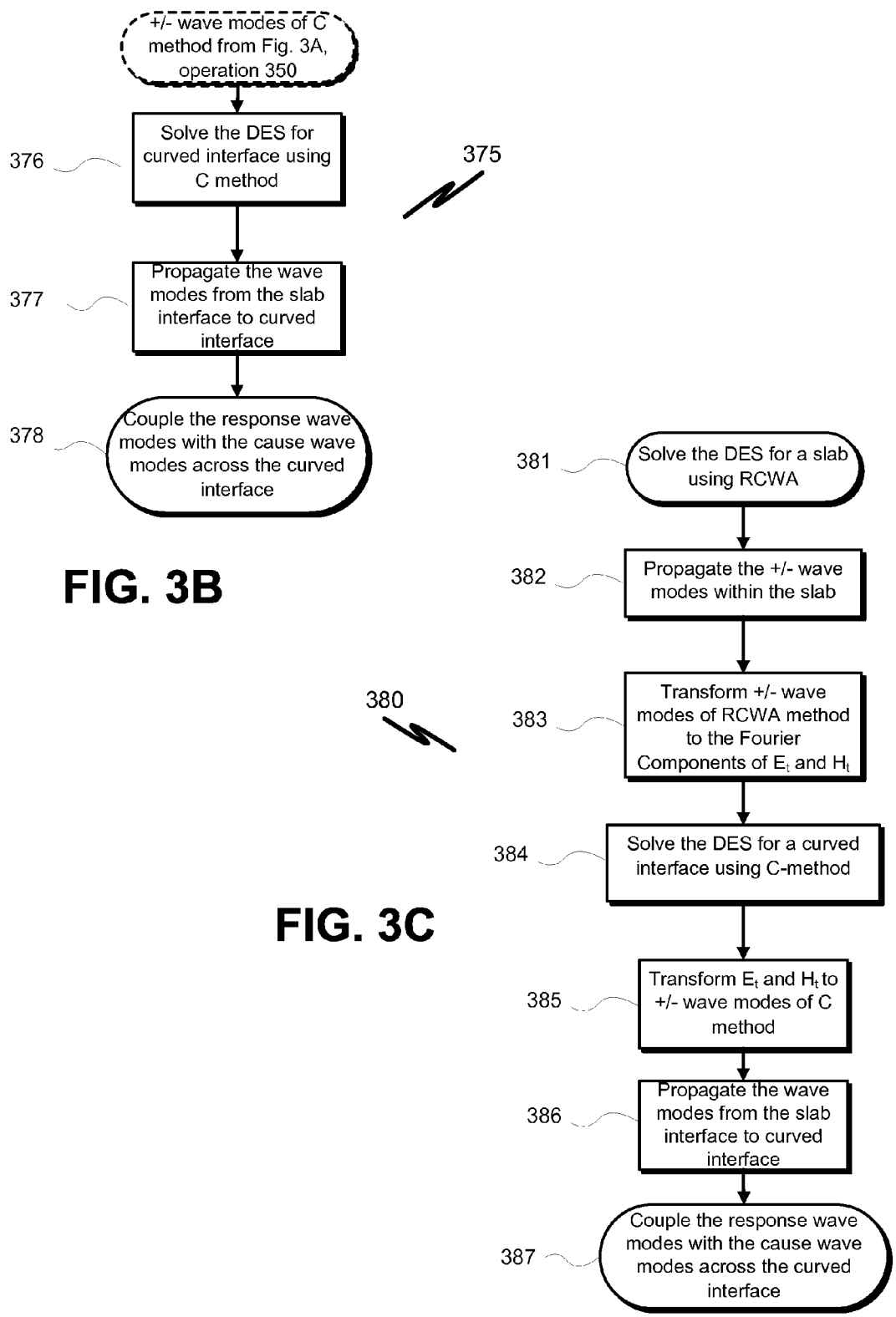
FIG. 3B illustrates an exemplary flow diagram illustrating a hybrid method of calculating a diffraction solution for a hybrid model profile, in accordance with an embodiment.
FIG. 3C illustrates an exemplary flow diagram illustrating a hybrid method of calculating a diffraction solution for a hybrid model profile, in accordance with an embodiment.

FIG. 3B depicts an alternate embodiment where a hybrid model solution involves first solving a first DES for a slab and then coupling that solution to a second DES solved for a curved interface. Such an embodiment is distinguished from method 300 in FIG. 3A where the hybrid model solution first solves a DES for a curved interface and then solves a DES for the slab. As an example, the method 375 depicted in FIG. 3B is applied subsequent to transforming the $E_t$, $H_t$ components back to ±wave modes at operation 350 (depicted in FIG. 3A) in the situation where the slab interface 2 (depicted in FIG. 2) is below an additional curved interface (not depicted).

As shown in FIG. 3B, with the ±wave modes of the C-method from operation 350, a DES for the additional curved interface may then be solved at operation 376 using the techniques as previously described for operation 301. The wave modes may then be propagated from the slab interface (e.g., slab interface 2 of FIG. 2) to the curved interface (not depicted) at operation 377 again using methods for non-parallel interfaces, such as the half spectrum connection method previously described in reference to operation 312. Notably, the direction of propagation at operation 377, being from a slab interface to a curved interface, is opposite that described for operation 312. Method 375 is completed by coupling the response and cause wave modes across the curved interface at operation 378. In one exemplary embodiment, the coupling is accomplished in the same manner previously described for operation 305.

FIG. 3C shows another exemplary embodiment where a DES for a slab is first solved using RCWA and then a second DES is solved for a curved interface using the C-method to arrive at a hybrid solution. The techniques described in detail in reference to methods 300 and 375 may be applied to the operation of method 380. Method 380 may be applied when a model profile is such that it is more efficient to first solve a DES for a slab and then solve a DES for a curved interface. As shown in FIG. 3C, method 380 begins with the RCWA solution for the slab DES at operation 381. At operation 382 the ±wave modes are propagated within the slab (i.e., between the first and second parallel slab interfaces). At operation 383 the ±wave modes are transformed to Fourier components of $E_t$, $H_t$ and the second DES for the curved interface is solved with the C-method. The $E_t$, $H_t$ components are then transformed into C-method ±wave modes at operation 385 and propagated from the slab interface to the curved interface at operation 386 (e.g., using the half spectrum connection method). The response wave modes are then coupled with the cause wave modes across the curved interface at operation 387.

Figure 4:
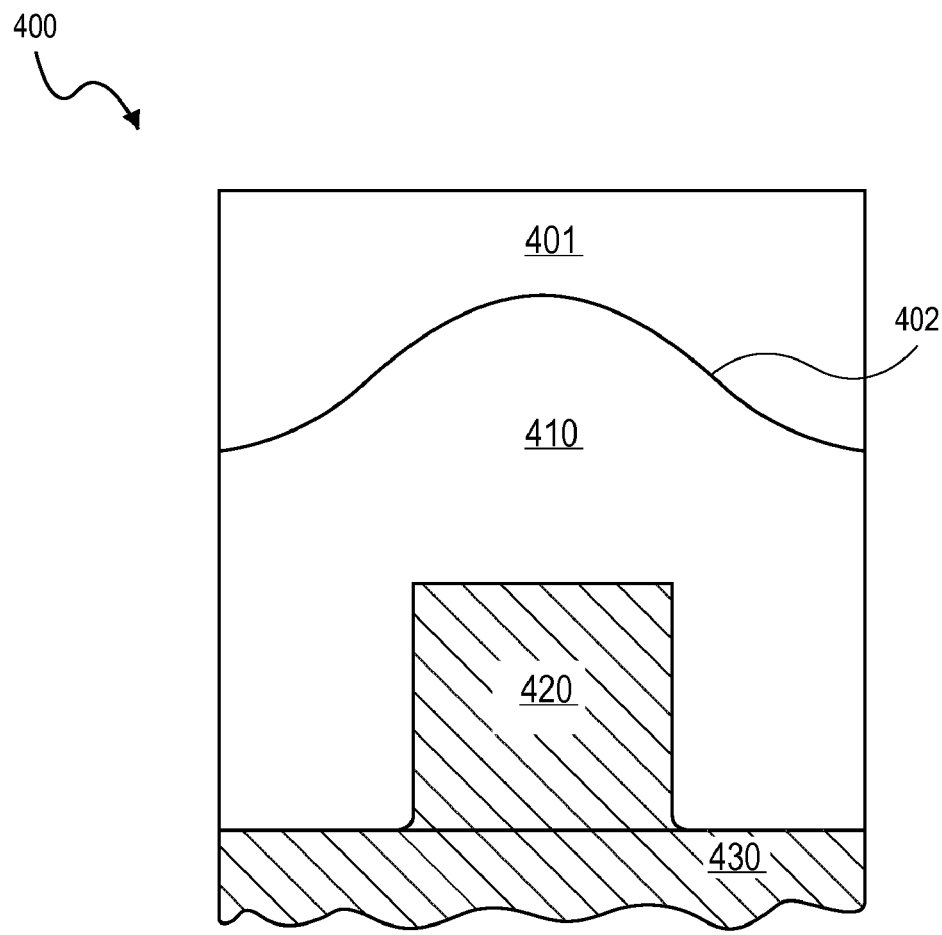
FIG. 4 illustrates an exemplary model stack for a diffracting structure formed during a microelectronic manufacturing process to which the hybrid diffraction solution methods depicted in FIG. 3A-3C may be applied.

The hybrid solution methods described herein may be applied to a wide variety of diffracting structures. In one exemplary embodiment, the hybrid solution methods depicted in FIGS. 3A through 3C may be applied in scatterometry applications to overcome limitations in the conventional RCWA solution method. As a particular example, FIG. 4 depicts a profile 400 of a diffracting structure resulting from certain microelectronic manufacturing operations. As shown, a superstrate 401 is disposed above a distorted material 410 which covers a patterned feature 420 disposed above a substrate 430. The distorted material 410 may be any conventional material such as a dielectric or metal, however in a particular embodiment, the distorted material 410 is a spin-coated material, such as, but not limited to, photoresist. The spin coating process may cause the distorted material 410 to have a continuous distortion over the patterned feature 420. Patterned feature 420 may be of any material, such as metals, semiconductors and dielectrics. While an RCWA method requires a large number of slices to model the distorted material 410 (e.g., as depicted in FIG. 1), the hybrid CRCWA solution method, such as that described in FIG. 3A or 3C, can efficiently solve a curved interface model of the interface 402 using one eigensolution and further solve a single slab model of the patterned feature 420 using one additional eigensolution to generate a modeled diffracted signal.

Figure 5:
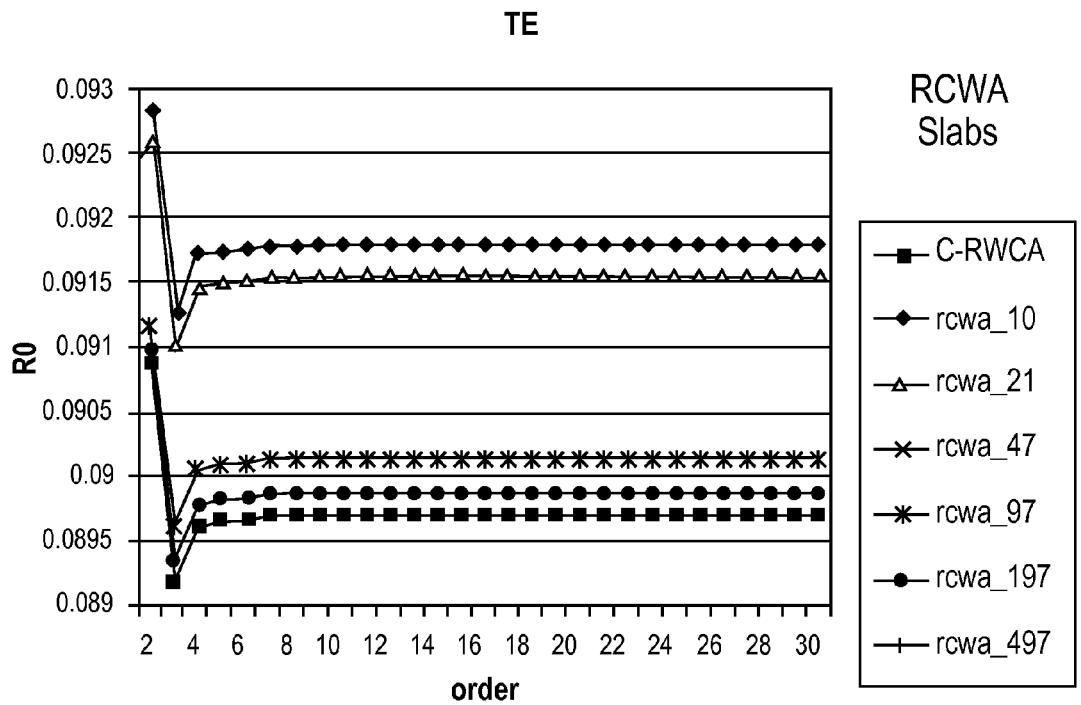
FIG. 5 illustrates a comparison of a reflection coefficient calculated for TE mode for the model stack depicted in FIG. 4 for both a RCWA method and a hybrid method in accordance with an embodiment.
Figure 6:
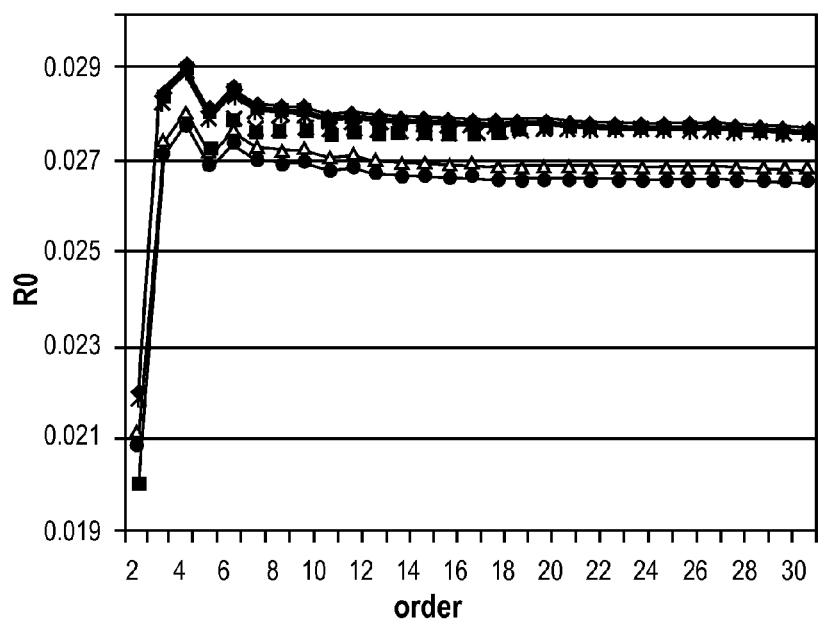
FIG. 6 illustrates a comparison of a reflection coefficient calculated for TM mode for the model stack depicted in FIG. 4 for both a RCWA method and a hybrid method in accordance with an embodiment.

FIGS. 5 and 6 depict a comparison between a hybrid CRCWA solution method and a conventional RCWA method modeling the profile 400 (where slabs are used to model the distorted material 410). The reflection coefficient diffracted into the zeroth order, $R_0$, is plotted as a function of truncation order across a number of RCWA slabs. As shown, the RCWA method requires approximately 500 slabs to converge to the correct result (as determined by the integral equation method). In contrast, the hybrid CRCWA method converges quickly, for example at order 10-15. Scatterometry measurements of other diffracting structure profiles may also be enhanced using the hybrid solution methods described herein (e.g., CRCWA). For example, profiles including patterned features having a low SWA or having high index contrast regimes may be more efficiently solved using CRCWA.

Figure 7A:
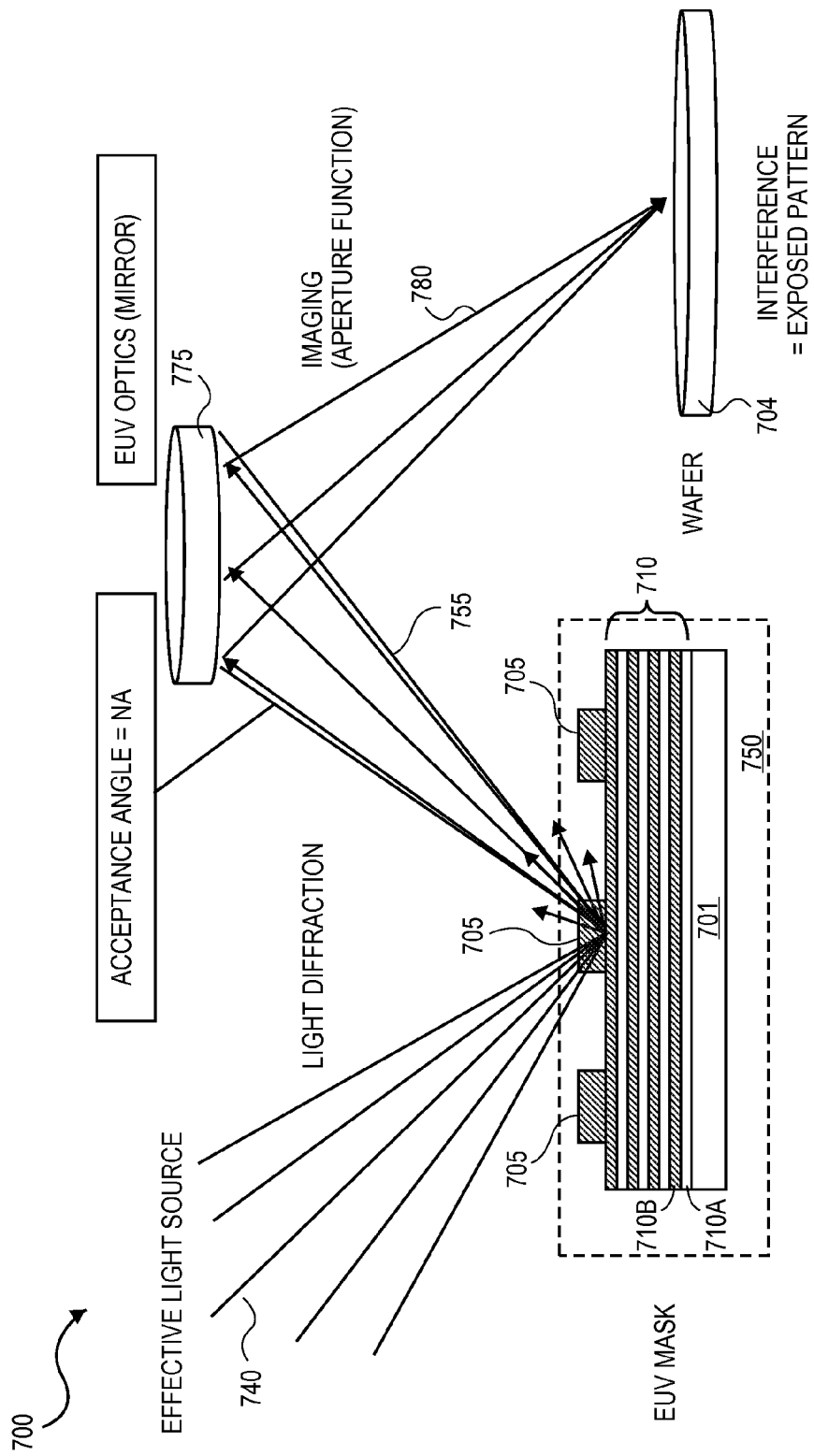
FIGS. 7A and 7B illustrate an exemplary photolithography modeling application to which the hybrid methods depicted in FIGS. 3A and 3B may be applied to generate a modeled angular spectrum of diffracted orders.
Figure 7B:
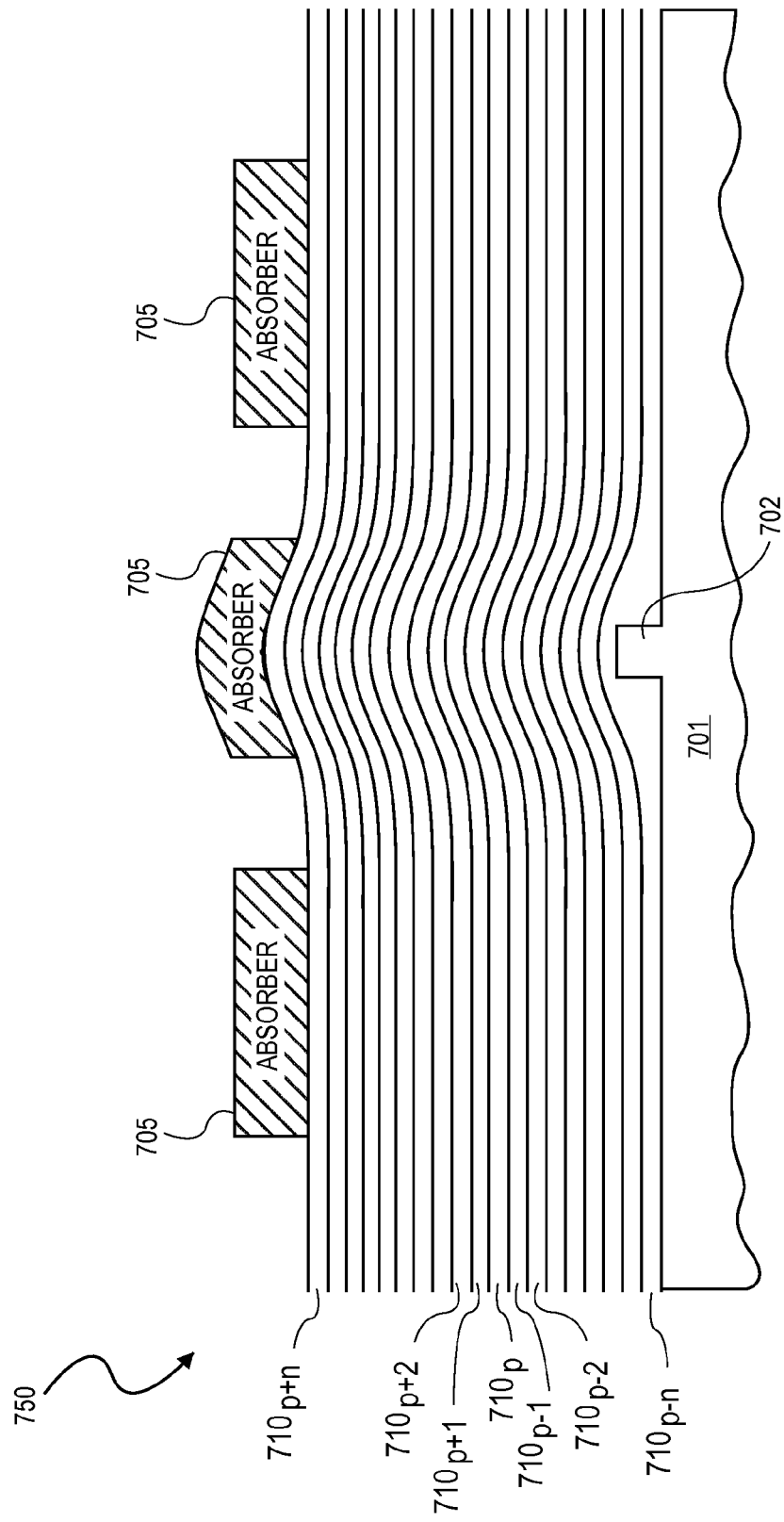

In addition to scatterometry embodiments, photolithographic simulations can also utilize the hybrid diffraction solution methods described herein. Although, photolithography typically utilizes a single radiation wavelength, the hybrid diffraction solution methods of FIG. 3A-3C are readily adaptable to generate modeled angular spectrums of diffraction orders including complex orders and/or higher orders in multiple dimensions. FIGS. 7A and 7B illustrate an exemplary photolithography modeling embodiments amenable to the hybrid diffraction solution methods depicted in FIG. 3A-3C. FIG. 7A depicts an exemplary extreme ultraviolet (EUV) photolithography apparatus 700. EUV is characterized by having a radiation wavelength less than approximately 13.5 nm. The EUV photolithography apparatus 700 is configured to operate in a purely reflective mode because of the very high absorption at such short wavelengths. As shown, an EUV mask 750 is exposed to a light source 740 and optics 775 directs reflected and diffracted light 755 from the EUV mask 750 onto a substrate 704 (e.g., semiconductor wafer) as imaging radiation 780 which exposes a pattern through interference. Because there are no bulk materials that achieve sufficient reflection at EUV wavelengths, a quarter wave stack 710 of alternating high and low refraction index (HL-stacks) layers 710A and 710B are used in the EUV mask 750. Absorber islands 705 disposed above the quarter wave stack 710 provide mask feature patterns. To properly size and position the absorber islands 705, it is important to accurately model the reflection and diffraction from the EUV mask 750.

In one embodiment of the present invention, a hybrid diffraction solution method is utilized to model diffraction of an EUV mask, such as that depicted in FIG. 7B, to characterize diffraction caused by distortions in an EUV mask. For example, FIG. 7B depicts an expanded view of the EUV mask 750. As shown, a defect 702 is disposed on the plate 701, below the quarter wave stack 710. The presence of defect 702 induces distortions in the layers $710_{p-n}$–$710_{p+n}$ of the quarter wave stack 710. Because there can be a large number of layers in the quarter wave stack 710 (e.g., 40 or more), an RCWA solution approximating the quarter wave stack 710 would require a very large number of slabs to model a slight distortion-induced degradation accurately. However, a hybrid solution method, according to one embodiment of the present invention employs the RCWA method for the top absorber layer and the C method for each interface between the layers $710_{p-n}$–$710_{p+n}$. In one such embodiment, only one slab is used for the absorber (having approximately vertical sidewalls) such that only one eigensolution is required for the absorber and only one eigensolution per layer. Any of the hybrid solution methods previously described, such as hybrid solution method 300 of FIG. 3A, may be applied to generate a diffraction model of the EUV mask 750. The hybrid diffraction model may then be output for a number of uses. For example, effects of the defect 702 on the image quality of the EUV mask 750 can be determined on the basis of the hybrid model output. The hybrid model may also be used to determine sources of distortion in the EUV mask 750.

Figure 8:
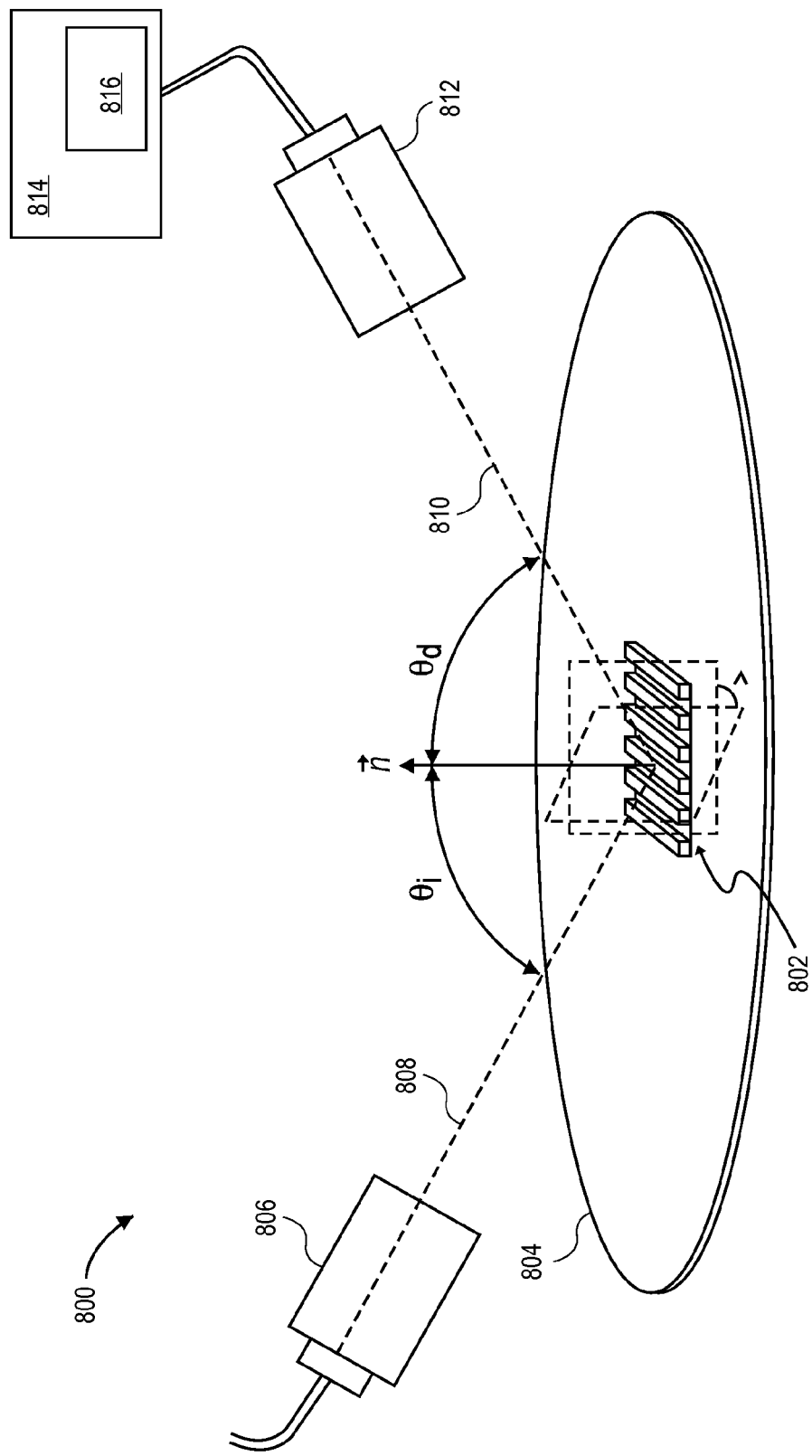
FIG. 8 illustrates an exemplary optical metrology system which may be utilized for scatterometry applications; in accordance with an embodiment.

FIG. 8 depicts an optical-metrology system 800 for scatterometry measurements which may utilize hybrid profile modeled in accordance with embodiments of the present invention to determine parameters of diffracting structures. The parameter space may encompass parameter values of all samples that will be measured. A parameter $p_i$ may be in the geometric domain (e.g., grating critical dimension (CD), SWA, height (HT), surface roughness, etc.), optical domain (e.g., angle of incidence, azimuth angle, extinction coefficient, index of refraction, etc.).

Optical-metrology system 800 includes an electromagnetic source 806 and a detector 812. A diffracting structure 802 is illuminated by an incident beam 808 from the electromagnetic source 806. The incident beam 808 may be polychromatic or monochromatic. For monochromatic embodiments, an exemplary wavelength of 633 nm may be used. In the exemplary embodiment depicts, the incident beam 808 is directed onto the diffracting structure 802 at an angle of incidence $\theta_i$ with respect to normal n of diffracting structure 802. A diffracted beam 810 leaves at an angle of $\theta_d$ with respect to normal n and is received by a detector 812. In alternative embodiments, the incident beam 808 may be directed to the diffracting structure 802 along the normal n. To determine the profile of the diffracting structure 102, the optical-metrology system 800 includes a processing module 814, which converts the diffracted beam 810 received by detector 812 into a diffraction signal (i.e., a measured-diffraction signal). A processing module 814 then compares the measured-diffraction signal to a modeled diffraction signal, which may be stored in a library 816. Each modeled diffraction signal may be associated with a model (hypothetical) profile. When a match is made between a measured diffraction signal and a modeled diffraction signal, the model profile associated with the matching simulated-diffraction signal may be identified as the real profile of the diffracting structure 802. One or more periods of the diffracting structure 802 may be illuminated and thus the determined profile may be based on an average representation of the illuminated periods. Moreover, the optical-metrology system 800 can be used to determine the profile of various types of single features formed on wafer 804, such as a line, space, contact hole, dot, and the like.

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 9:
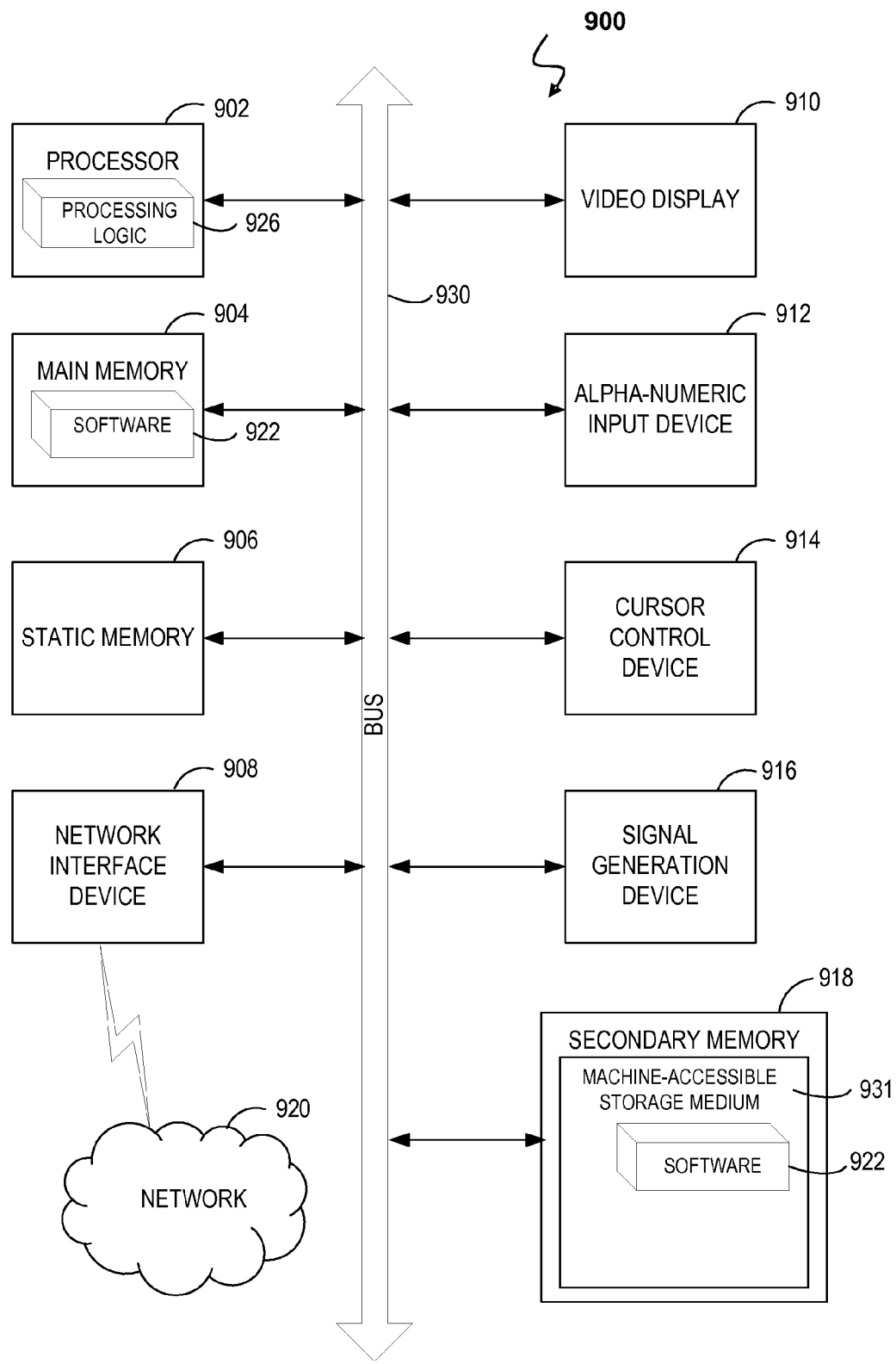
FIG. 9 illustrates a block diagram of an exemplary computer system, in accordance with one embodiment.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 931 on which is stored one or more sets of instructions (e.g., software 922) embodying any one or more of the hybrid solution methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface device 908.

The machine-accessible storage medium 931 may also be used to store a software library containing data representing diffracted signals generated with a hybrid diffraction model. The machine-accessible storage medium 931 may further be used to store one or more additional components. While the machine-accessible storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Figure 10:
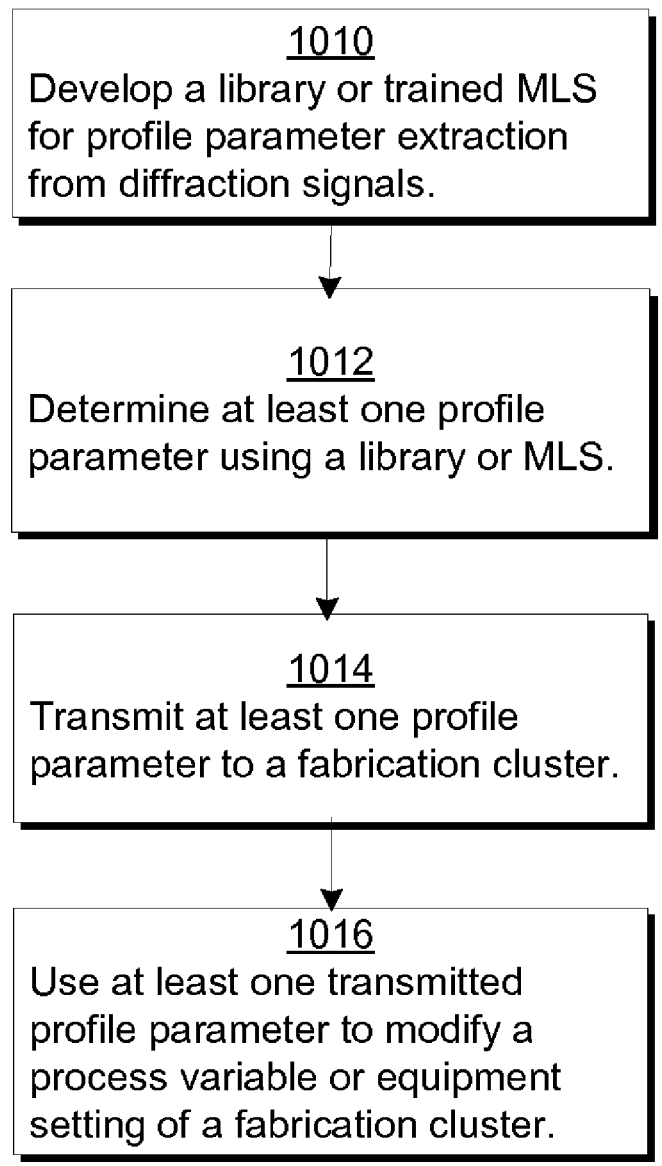
FIG. 10 is an exemplary flow diagram for determining and utilizing profile parameters for automated process and equipment control, in accordance with one embodiment.

FIG. 10 is an exemplary flowchart for determining and utilizing profile parameters for automated process and equipment control. In step 1010, a library and/or trained machine learning systems (MLS) are developed to extract profile parameters from the measured diffraction signals. In step 1012, at least one profile parameter of a structure is determined using the library or the trained MLS. In step 1014, the at least one profile parameter is transmitted to a fabrication cluster configured to perform a processing step, where the processing step may be executed in the semiconductor manufacturing process flow either before or after measurement step 1012 is made. In step 1016, the at least one transmitted profile parameter is used to modify a process variable or equipment setting for the processing step performed by the fabrication cluster.

Figure 11:
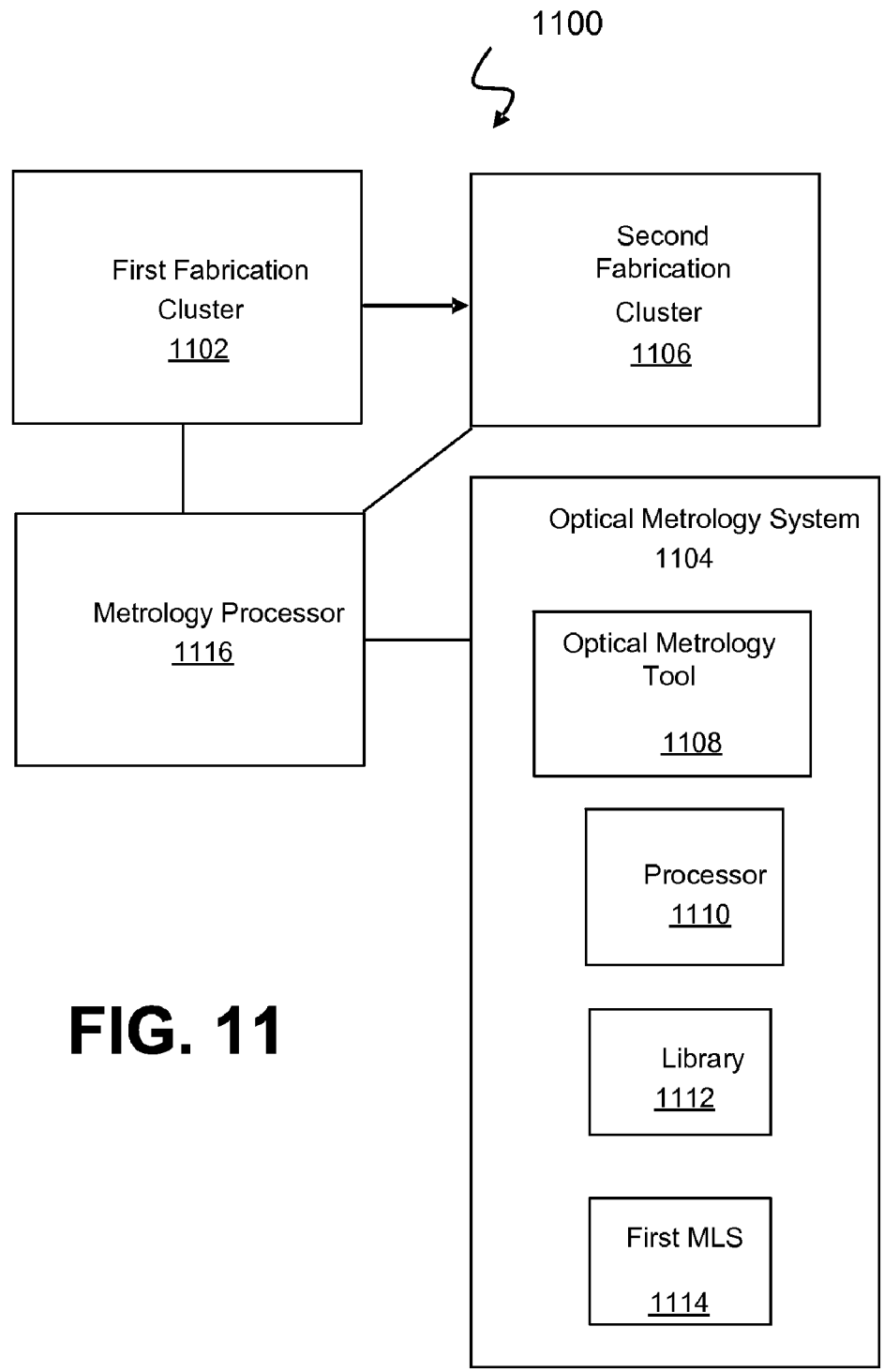
FIG. 11 is an exemplary flow diagram for determining and utilizing profile parameters for automated process and equipment control, in accordance with one embodiment.

FIG. 11 is an exemplary block diagram of a system for determining and utilizing profile parameters for automated process and equipment control. System 1100 includes a first fabrication cluster 1102 and optical metrology system 1104. System 1100 also includes a second fabrication cluster 1106. Although the second fabrication cluster 1106 is depicted in FIG. 11 as being subsequent to first fabrication cluster 1102, it should be recognized that second fabrication cluster 1106 can be located prior to first fabrication cluster 1102 in system 1100 (e.g., and in the manufacturing process flow).

A photolithographic process, such as exposing and/or developing a photoresist layer applied to a wafer, can be performed using first fabrication cluster 1102. In one exemplary embodiment, optical metrology system 1104 includes an optical metrology tool 1108 and processor 1110. Optical metrology tool 1108 is configured to measure a diffraction signal off of the structure. If the measured diffraction signal and the simulated diffraction signal match, one or more values of the profile parameters are determined to be the one or more values of the profile parameters associated with the modeled diffraction signal. Similar processing and inspection may be performed for photolithographic mask manufacture.

In one exemplary embodiment, optical metrology system 1104 can also include a library 1112 with a plurality of simulated (i.e., calculated) diffraction signals and a plurality of values of one or more profile parameters associated with the plurality of modeled diffraction signals. As described above, the library can be generated in advance; metrology processor 1110 can compare a measured diffraction signal of a structure to the plurality of modeled diffraction signals in the library. When a matching modeled diffraction signal is found, the one or more values of the profile parameters associated with the matching modeled diffraction signal in the library is assumed to be the one or more values of the profile parameters used in the wafer application to fabricate the structure.

System 1100 also includes a metrology processor 1116. In one exemplary embodiment, processor 1110 can transmit the one or more values of the one or more profile parameters to metrology processor 1116. Metrology processor 1116 can then adjust one or more process parameters or equipment settings of first fabrication cluster 1102 based on the one or more values of the one or more profile parameters determined using optical metrology system 1104. Metrology processor 1116 can also adjust one or more process parameters or equipment settings of the second fabrication cluster 1106 based on the one or more values of the one or more profile parameters determined using optical metrology system 1104. As noted above, fabrication cluster 1106 can process the wafer before or after fabrication cluster 1102. In another exemplary embodiment, processor 1110 is configured to train machine learning system 1114 using the set of measured diffraction signals as inputs to machine learning system 1114 and profile parameters as the expected outputs of machine learning system 1114.

It is to be understood that the above description is intended to be illustrative, and not restrictive. Many other embodiments will be apparent to those of skill in the art upon reading and understanding the above description. Although the present invention has been described with reference to particular embodiments, it will be recognized that the invention is not limited to the embodiments described and can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of generating a modeled angular spectrum of diffracted orders for at least a portion of a diffracting photolithographic mask including a patterned absorber material disposed above a plurality of unpatterned layers forming a high and low refractive index (HL) quarter wave stack, the method comprising:

calculating the modeled angular spectrum of diffracted orders resulting from modeled electromagnetic radiation incident to a hybrid model profile of the diffracting photolithographic mask portion, the hybrid model profile including a plurality of curved interfaces which varies with respect to a first dimension, each of the curved interfaces representing an interface between two adjacent unpatterned layers of the (HL) quarter wave stack, and a horizontal slab defined by two parallel interfaces which are constant with respect to the first dimension representing the patterned absorber material; and predicting how the diffracting photolithographic mask images onto a substrate based on the modeled angular spectrum of diffracted orders.

2. A method as in claim 1, wherein the modeled electromagnetic radiation has a wavelength of approximately 13.5 nm or smaller; and wherein only one eigensolution is generated for the absorber and only one eigensolution is provided for each of the unpatterned layers.

3. A method as in claim 1, wherein calculating the modeled angular spectrum of diffracted orders for the hybrid model profile further comprises:

solving a first differential equation system in curvilinear coordinates for a first diffraction amplitude at a first of the curved interfaces;

coupling a first plurality of response wave modes with a first plurality of cause wave modes across the first of the curved interfaces based on the solution of the first differential equation system;

propagating the first plurality of response and cause wave modes from the first of the curved interfaces to a first of the two planar interfaces proximate to the first of the curved interfaces;

transforming the first plurality of cause and response wave mode amplitudes into a first vector of Fourier components of the tangential electro-magnetic field;

solving a second differential equation system in Cartesian coordinates for a second diffraction amplitude at the horizontal slab;

coupling the first vector of Fourier components of the tangential electro-magnetic field with a second plurality of cause and response wave modes based on the solution of the second differential equation system; and propagating the second plurality of cause and response wave modes from the first of the planar interfaces to a second of the planar interfaces.

4. A machine-accessible non-transitory storage medium having instructions stored thereon which cause a data processing system to perform a method of generating a modeled angular spectrum of diffracted orders for at least a portion of a diffracting photolithographic mask including a patterned absorber material disposed above a plurality of unpatterned layers forming a high and low refractive index (HL) quarter wave stack, the method comprising:

calculating the modeled angular spectrum of diffracted orders resulting from modeled electromagnetic radiation incident to a hybrid model profile of the diffracting photolithographic mask portion, the hybrid model profile including a plurality of curved interfaces which varies with respect to a first dimension, each of the curved interfaces representing an interface between two adjacent unpatterned layers of the (HL) quarter wave stack, and a horizontal slab defined by two parallel interfaces which are constant with respect to the first dimension representing the patterned absorber material; and predicting how the diffracting photolithographic mask images onto a substrate based on the modeled angular spectrum of diffracted orders.

5. A medium as in claim 4, further comprising instructions for:

solving a first differential equation system of a first of the curved interfaces by a curvilinear coordinate transformation method;

solving a second differential equation system of the horizontal slab by a rigorous coupled-wave method;

recursively coupling a plurality of response wave modes with a plurality of cause wave modes between the curved interface solution and the horizontal slab solution with an S-matrix algorithm to generate a scattering matrix for the hybrid model profile; and extracting the upper left quarter sub-matrix of the scattering matrix as a reflection matrix for the hybrid model profile.

6. A method as in claim 1, wherein the layers of the HL stack are distorted by an underlying defect;

wherein each of the curved interfaces models an interface of the HL stack layers as distorted by the underlying defect; and wherein predicting how the diffracting photolithographic mask images onto a substrate further comprises determining an effect of the underlying defect on an image formed with the diffracting photolithographic mask based on the modeled angular spectrum of diffracted orders.

7. A method as in claim 1, wherein calculating the angular spectrum of diffracted orders further comprises:

solving a first differential equation system for each of the curved interfaces with a curvilinear coordinate transformation method;

solving a second differential equation system of the horizontal slab with a rigorous coupled-wave method;

recursively coupling a plurality of response wave modes with a plurality of cause wave modes between the curved interface solution and the horizontal slab solution with an S-matrix algorithm to generate a scattering matrix for the hybrid model profile; and extracting a sub-matrix of the scattering matrix as a reflection matrix for the hybrid model profile.

8. A data processing system for generating a modeled angular spectrum of diffracted orders for at least a portion of a diffracting photolithographic mask including a patterned absorber material disposed above a plurality of unpatterned layers forming a high and low refractive index (HL) quarter wave stack, the data processing system comprising:

a memory to store a location of a defect in the photolithographic mask inducing distortions in two or more layers of the quarter wave stack;

a microprocessor to calculate a modeled angular spectrum of diffracted orders resulting from modeled electromagnetic radiation incident to a hybrid model profile of the diffracting photolithographic mask portion, the hybrid model profile including a plurality of curved interfaces which varies with respect to a first dimension, each of the curved interfaces representing an interface between two adjacent unpatterned layers of the (HL) quarter wave stack, and a horizontal slab defined by two parallel interfaces which are constant with respect to the first dimension representing the patterned absorber material, and wherein the microprocessor is to determine how the diffracting photolithographic mask images onto a substrate based on the modeled angular spectrum of diffracted orders.

9. The data processing system of claim 8, wherein the modeled electromagnetic radiation has a wavelength of approximately 13.5 nm or smaller; and wherein the microprocessor is to generate only one eigensolution for the absorber and only one eigensolution for each of the two or more unpatterned layers.

10. The data processing system of claim 8, wherein the microprocessor is to calculate the modeled angular spectrum of diffracted orders for the hybrid model profile by:

solving a first differential equation system in curvilinear coordinates for a first diffraction amplitude at a first of the curved interfaces;

coupling a first plurality of response wave modes with a first plurality of cause wave modes across the first of the curved interfaces based on the solution of the first differential equation system;

propagating the first plurality of response and cause wave modes from the first of the curved interfaces to a first of the two planar interfaces proximate to the first of the curved interfaces;

transforming the first plurality of cause and response wave mode amplitudes into a first vector of Fourier components of the tangential electro-magnetic field;

solving a second differential equation system in Cartesian coordinates for a second diffraction amplitude at the horizontal slab;

coupling the first vector of Fourier components of the tangential electro-magnetic field with a second plurality of cause and response wave modes based on the solution of the second differential equation system; and propagating the second plurality of cause and response wave modes from the first of the planar interfaces to a second of the planar interfaces.

\* \* \* \* \*